(12) United States Patent
Welsh et al.

(10) Patent No.: US 7,224,807 B2
(45) Date of Patent: May 29, 2007

(54) SYSTEM FOR COMPUTATIONALLY EFFICIENT ACTIVE CONTROL OF TONAL SOUND OR VIBRATION

(75) Inventors: William Arthur Welsh, New Haven, CT (US); Douglas G. MacMartin, San Gabriel, CA (US); Alan M. Finn, Hebron, CT (US)

(73) Assignee: Sikorsky Aircraft Corporation, Stratford, CT (US)

( * ) Notice: Subject to any disclaimer, the term of this patent is extended or adjusted under 35 U.S.C. 154(b) by 925 days.

(21) Appl. No.: 10/083,773

(22) Filed: Feb. 27, 2002

(65) Prior Publication Data

US 2002/0118844 A1 Aug. 29, 2002

Related U.S. Application Data

(60) Provisional application No. 60/271,479, filed on Feb. 27, 2001.

(51) Int. Cl.
*A61F 11/06* (2006.01)
*G10K 11/16* (2006.01)
*H03B 29/00* (2006.01)

(52) U.S. Cl. .................. 381/71.8; 702/56; 700/280

(58) Field of Classification Search ............. 702/56; 381/94.2, 94.3, 71.8; 700/280; 341/143, 341/122; 244/173.2
See application file for complete search history.

(56) References Cited

U.S. PATENT DOCUMENTS 5,347,586 A 9/1994 Hill et al.
5,558,298 A 9/1996 Pla et al.
5,627,896 A * 5/1997 Southward et al. ...... 381/71.11

(Continued)

FOREIGN PATENT DOCUMENTS

EP 0560364 A1 3/1993

(Continued)

OTHER PUBLICATIONS

Break Nyquist Criterion Using Undersampling Technique, Q2 2005 issue of Instrumentation Newsletter, National Instruments, □□http://zone.ni.com/devzone/cda/tut/p/id/3915.*

(Continued)

*Primary Examiner*—Vivian Chin
*Assistant Examiner*—Jason Kurr
(74) *Attorney, Agent, or Firm*—Carlson, Gaskey & Olds, PC

(57) ABSTRACT

A noise or vibration control system reduces a sampling rate and reduces a control rate to improve computation efficiency. The present invention permits the use of a sample frequency ($f_s$) that is less than twice the frequency of interest ($f_d$). The sensed signals are filtered to extract a particular frequency range with a lower bound given by $(2n-1)*f_s/2$ and an upper bound given by $(2n+1)*f_s/2$, where n is an integer chosen so that the frequency of interest ($f_d$) is within the extracted frequency range. The control commands are also calculated at a reduced rate, which is dependent upon the bandwidth of the tone, rather than the absolute frequency of the tone. Rather than updating the control signals directly on the sampled sensor data $y_k$ as it enters the computer, the control computations are done on the harmonic components $a_k$ and $b_k$, or equivalently on the magnitude and phase.

21 Claims, 3 Drawing Sheets

U.S. PATENT DOCUMENTS

| | | | |
|---|---|---|---|
| 5,629,986 A * | 5/1997 | Shoureshi | 381/71.12 |
| 5,845,236 A * | 12/1998 | Jolly et al. | 702/195 |
| 5,940,519 A | 8/1999 | Kuo | |
| 6,005,506 A * | 12/1999 | Bazarjani et al. | 341/143 |
| 6,138,947 A | 10/2000 | Welsh et al. | |
| 6,216,059 B1 * | 4/2001 | Ierymenko | 700/280 |
| 6,429,939 B1 * | 8/2002 | Bennett et al. | 356/463 |
| 6,493,689 B2 * | 12/2002 | Kotoulas et al. | 706/23 |
| 6,772,074 B2 * | 8/2004 | Millott et al. | 702/56 |
| 6,856,920 B2 * | 2/2005 | Millott et al. | 702/56 |
| 7,003,380 B2 * | 2/2006 | MacMartin et al. | 700/280 |

FOREIGN PATENT DOCUMENTS

| | | |
|---|---|---|
| EP | 0778559 A2 | 3/1993 |
| JP | EP 0 814 279 A2 * | 6/1997 |
| WO | WO 00/20775 * | 4/2000 |

OTHER PUBLICATIONS

Search Report for PCT/US02/05916, International Filing Date Feb. 27, 2002.

MacMartin, Douglas G., Davis, Mark W., Yoerkie, Jr., Charles A., Welsh, William A., Helicopter Gear-Mesh ANC Concept Demonstration, United Technologies Research Center, East Hartford, CT and Sikorsky Aircraft Corporation, Stratford, CT.

Millott, Thomas A., Welsh, William A., Yoerkie, Jr., Charles A., MacMartin, Douglas G., Davis, Mark W., Flight Test of Active Gear-Mesh Noise Control on the S-76 Aircraft, United Technologies Research Center, East Hartford, CT and . . . Sikorsky Aircraft Corporation, Stratford, CT. Presented at the American Helicopter Society 54th Annual Forum, Washington, D.C., May 20-22, 1998, American Helicopter Society, Inc.

Davis, Mark W., Refinement and Evaluation of Helicopter Real-Time Self-Adaptive Active Vibration Controller Algorithms, NASA Contractor Report 3821, Aug. 1984.

U.S. Patent Application: "Computationally Efficient Means for Optimal Control with Control Constraints", U.S. Appl. No. 10/083,774, filed Feb. 27, 2002.

U.S. Patent Application: "System for Computationally Efficient Adaptation of Active Control of Sound or Vibration", U.S. Appl. No. 10/084,254, filed Feb. 27, 2002.

* cited by examiner

US 7,224,807 B2

SYSTEM FOR COMPUTATIONALLY EFFICIENT ACTIVE CONTROL OF TONAL SOUND OR VIBRATION

This application claims priority to U.S. Provisional Application Ser. No. 60/271,479, Filed Feb. 27, 2001.

BACKGROUND OF THE INVENTION

1. Field of the Invention

This invention relates generally to active control of sound, vibration or other physical phenomena. More particularly, this invention relates to increasing the computational efficiency of active control of sound or vibration by reducing a sampling rate and reducing a control rate.

2. Background

Conventional active control systems consist of a number of sensors that measure the ambient variables of interest (e.g. sound or vibration), a number of actuators capable of generating an effect on these variables (e.g. by producing sound or vibration), and a computer which processes the information received from the sensors and sends commands to the actuators so as to reduce the amplitude of the sensor signals. The control algorithm is the scheme by which the decisions are made as to what commands to the actuators are appropriate.

Many relevant sound/vibration problems are tonal in nature, that is, the variable of interest has information predominantly at relatively few distinct frequencies (or within a narrow bandwidth about these frequencies). Such is the case, for example, where rotating machinery causes the noise or vibration. One key problem, particularly for higher frequency applications, is the computational burden required to directly implement active control solutions using existing approaches. In typical control systems, the amount of computation required for the control algorithm is proportional to the frequency of the noise or vibration.

Most active control approaches use digital signal processors (DSP's) and require sampling of the signals from the sensor or sensors of interest (microphones and/or accelerometers in the current application). Typically, the sampling frequency, $f_s$, is at least twice, and usually roughly three times the highest frequency of interest. This is to prevent aliasing, and follows from the Nyquist criterion. The Nyquist criterion or sampling theorem states that for a sample rate $f_s$, information in any frequency band between $(2n-1)*f_s/2$ and $(2n+1)*f_s/2$ for integer n aliases to the band of interest from $-f_s/2$ to $f_s/2$. Thus for a frequency of interest $f_d$, information on the sensor signals at any of the frequencies $|f_d \pm nf_s|$ for n=1, 2, 3, ... will be indistinguishable from the desired information at $f_d$ and will result in degraded control performance. To avoid this aliasing "noise", anti-alias low-pass filters are used with a corner frequency $f_c$ larger than $f_d$ and smaller than $f_s$ so that the filter attenuates information at frequency $f_s - f_d$ sufficiently to avoid a significant loss in performance.

Similarly, if the DSP outputs at a frequency $f_s$ a signal of frequency $f_d$ then there are additional tones generated at frequencies $|f_d \pm nf_s|$ for integer n. Low-pass reconstruction filters are required to smooth the actuator command signals so that only the desired frequency component has significant energy content.

Once the sensor data is within the DSP, all of the computations related to the control algorithm are typically performed at the same sample rate $f_s$, and the resulting control signals are output to the actuators at the same sample rate. For a tonal problem at frequency $f_d$, a sensor signal $y_k$ in the computer at time $t_k$ can be written as $$y_k = a_k \cos(f_d t_k) + b_k \sin(f_d t_k) + w_k$$

where $w_k$ is the background noise, and $a_k$ and $b_k$ represent the information about the tone. One possible way to perform the control computation for a tonal problem is as follows. First, the sensor signal(s) are multiplied by reference sine and cosine signals at the frequency of interest. For most tonal applications, this disturbance frequency can be easily obtained from suitable reference sensors. This demodulation process is one of several methods for obtaining estimates of the time-varying variables $a_k$ and $b_k$ above. The resulting signals are passed through a gain matrix (2×2 for a single sensor and actuator, or $2n_a \times 2n_s$ for a problem with $n_a$ actuators and $n_s$ sensors). For a large number of sensors and actuators, the matrix multiplication involved is computationally expensive. After passing through a low pass filter, the signals are again multiplied by the same reference sine and cosine terms and added to form the output. It can be shown that this process results in excellent disturbance rejection at the frequency of the reference signals, and is similar to many other tonal control approaches. The gain matrix and the frequency of the low pass filter determine the magnitude and phase of the compensator in the neighborhood of the reference frequency. The process can be extended to any number of tones.

SUMMARY OF THE INVENTION

The active control systems implementing the improvements described herein enable a substantial reduction in computational requirements for band-limited control problems, and in particular for tonal problems. There are two key contributions that enable this reduction; the first reduces the sample rate required, and the second enables the control computations to occur at a much lower frequency related only to the bandwidth of the tone, and not to its absolute frequency.

Accordingly, one embodiment of the present invention is directed to an apparatus and method of sensing a physical variable at a reduced sample rate. The present invention permits the use of a sample frequency ($f_s$) that is less than twice the frequency of interest ($f_d$). The sensed signals are filtered to extract a particular frequency range with a lower bound given by $(2n-1)*f_s/2$ and an upper bound given by $(2n+1)*f_s/2$, where n is an integer chosen so that the frequency of interest ($f_d$) is within the extracted frequency range. Similarly, the present invention permits the use of an output frequency that is less than twice the frequency of interest. The output signals are band-pass filtered in a similar manner to the sensed signals where the frequency of interest is within the extracted frequency range.

Another embodiment is directed to an apparatus and method for computing control commands at a reduced rate, which is dependent upon the bandwidth of the tone, rather than the absolute frequency of the tone. Rather than updating the control signals directly on the sampled sensor data $y_k$ as it enters the computer, the control computations are done on the harmonic components $a_k$ and $b_k$, or equivalently on the magnitude and phase. The critical observation is that these variables change at a much slower rate than the original sample rate. Therefore, the basic approach described earlier can be modified by down-sampling the estimates of the harmonic components to a lower update frequency $f_u$, performing control computations at this reduced frequency, and then generating the control output at a higher frequency that need not be equal to $f_s$.

DETAILED DESCRIPTION

Figure 1:
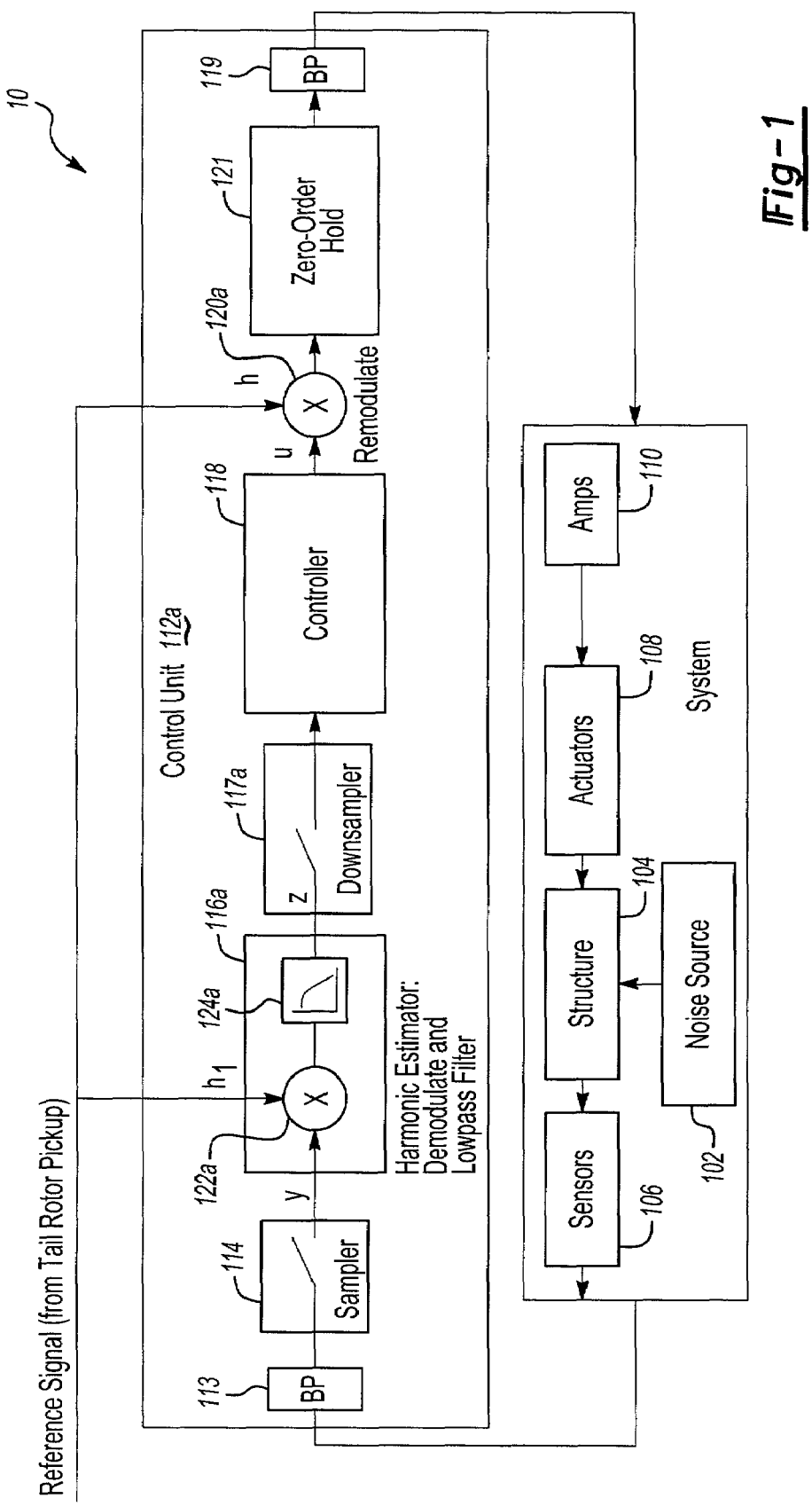
FIG. 1 shows a block diagram of the noise or vibration control system of the present invention.

FIG. 1 shows a block diagram of an active control system 10. The system comprises a disturbance source 102 acting on a structure 104, sensors 106 which measure the response of the structure 104, force generators (also referred to as actuators) 108 acting on the structure 104, amplifiers 110 driving the actuators 108 and a control unit 112a that sends control signals that control the actuators 108 based upon the signals from the sensors 106. The operation of the control unit 112a is the subject of this invention.

The noise source 102 produces undesired disturbances. In a helicopter, for example, the undesired disturbances are typically due to a rotor blade, gear clash or other source of vibration or noise. A plurality of sensors 106 measure the ambient variables of interest (e.g. sound or vibration). The sensors (generally 106) are typically microphones, tachometers, accelerometers or optical sensors. Sensors 106 each generate an electronic signal that corresponds to sensed noise from noise source 102 and structure 104.

Actuators 108 are typically speakers, shakers or virtually any suitable signal source. Actuators 108 receive commands from the control unit 112a and output a force to compensate for the sensed noise produced by noise source 102.

Control unit 112a includes a sampler 114, harmonic estimator 116a, downsampler 117a, controller 118, remodulator 120a, zero-order hold 121 and an optional bandpass filter 119. The controller is typically a processing module or microprocessor with processing capabilities and includes appropriate memory, such as RAM, ROM, CD, DVD, hard drive, or other electronic, magnetic or optical storage, storing computer programs for performing the necessary algorithms. The entire control unit is preferably implemented using a suitably programmed microprocessor.

The electronic signals from the sensors 106 are filtered by bandpass filter 113 and sampled by sampler 114 at a sample rate $f_s$. The bandpass filter 113 is centered around the frequency of interest, $f_d$, and has lower and upper bounds given by $(2n-1)*fs/2$ and $(2n+1)*fs/2$ In the present invention, it is assumed that the frequency $f_d$ of the noise to be controlled in this invention is tonal in nature, but having some bandwidth centered about $f_d$. The sample rate $f_s$ is preferably chosen to be two and a half times the bandwidth of the noise sought to be controlled (theoretically, this could be as low as twice the bandwidth, but in practical application, at least 2.5×).

Provided that the band-pass filter extracts only a single frequency range with lower and upper bounds given by $(2n-1)*f_s/2$ and $(2n+1)*f_s/2$ for some integer n, then there is minimal anti-aliasing noise and associated reduction of control performance. As noted earlier, information at any frequency in the set $|f_d \pm nf_s|$ all manifest themselves identically after sampling. Using only low-pass anti-aliasing filters, then $f_d$ must be the lowest frequency in the above set in order to resolve it. However, by adding high-pass anti-aliasing as well, then the sensor signals can be attenuated at frequencies in the set that are less than $f_d$, and hence the desired information can be extracted. An alternate explanation is that the desired signal is aliased to a lower frequency within the computer, and that if there is no information present at that lower frequency in the original sensor signal, then the desired information can be extracted. In a helicopter gear-mesh noise control application, for example, some aliasing noise is accepted, however, the majority of it is filtered out. Thus, the sampling rate $f_s$ need only be 2× (or 2.5×) the bandwidth of the noise to be controlled, rather than 2× (or 2.5×) the actual frequency of interest, $f_d$. This significantly decreases the sampling rate and computational load on the control unit 112a.

A similar process can be used to reduce the output frequency $f_o$ to be 2× (or 2.5×) the bandwidth of the noise to be controlled, rather than 2× (or 2.5×) the actual frequency of interest $f_d$. If a sampled signal at frequency $f_1$ is passed through a zero-order hold at an output frequency $f_o$ then the resulting continuous signal will contain information at frequency $f_1$ and also $f_o + f_1$, etc. Typically, the output signals are passed through a low-pass filter before going to the actuators. If they are instead passed through a band-pass filter that extracts only a single frequency range with lower and upper bounds given by $(2n-1)*f_o/2$ and $(2n+1)*f_o/2$ for interger n chosen so that the extracted frequency range includes $f_d$, then the desired output signal can be obtained when $f_o$ is less than twice $f_d$.

A second aspect of the present invention reduces the rate at which the control computations are performed by controller 118. If there are many sensors 106 and actuators 108 required, and if the frequency to be controlled is high, then the computational savings obtained from this invention are critical to achieving a practical system. Rather than updating the control signals directly on the sampled sensor data $y_k$ as it enters the computer, the control computations are done on the harmonic components $a_k$ and $b_k$ as described earlier, or equivalently on the magnitude and phase. The critical observation is that these variables change at a much slower rate than the original sample rate. Therefore, the basic approach described earlier can be modified by down-sampling the estimates of the harmonic components to a lower update frequency $f_u$, performing control computations at this reduced frequency, and then generating the control output at a higher frequency that need not be equal to $f_s$. As a result of this invention, the update frequency required for control computation is related to the bandwidth of the tone, rather than its absolute frequency. This generates enormous computational savings in high frequency applications, and is of particular importance in multi-input, multi-output situations, and in cases where the control computations must be complicated to allow for adaptation. All three of these situations apply to the helicopter gear-mesh noise control application.

This process is illustrated schematically in components 116a, 117a and 118 of FIG. 1. The harmonic estimator 116a includes a demodulator 122a and low pass filter 124a, which are essentially combined in the technique described below. The downsampler 117a samples this information, $z_{1k}$, at an update frequency $f_{u1}$. The controller 118 then performs the control algorithms at the update frequency $f_{u1}$, rather than the sample frequency $f_s$ or the frequency of the noise $f_d$.

One possible approach to obtaining estimates of the harmonic components of the signal is to multiply by reference sine and cosine signals at the desired frequency, as described earlier. This shifts whatever information occurs at this frequency in the data to near zero frequency in the new signals. A low-pass anti-aliasing filter 124a is then used to prevent any aliasing in sampling of this signal by the downsampler 117a at the lower update frequency $f_{u1}$. Alternate approaches include taking fast-Fourier transforms and extracting the desired frequency bin, or using synchronous sampling and a fixed reference sinusoid to avoid continually generating the sine and cosine terms from the disturbance frequency. The approach used in reducing these inventions to practice for rotorcraft gear mesh noise control is similar to the demodulation and low-pass filtering approach, but combines the two steps for simplicity, and provides a clear advantage over a straightforward filter. The harmonic estimates are computed according to the following equations, which can be interpreted as a least-mean-square (LMS) algorithm for estimating the parameters $a_k$ and $b_k$ defined earlier.

$$H=[1\ \cos(f_d t_k)\ \sin(f_d t_k)\ \cos(f_x t_k)\ \sin(f_x t_k);\ \ldots\ ]^T.$$

$$z_{1,k}=z_{1,k-1}+\rho H(y_k-H^T z_{1,k-1})$$

The vector H includes all of the tones that are of interest in the application; the above equation includes the desired disturbance frequency $f_d$, a second frequency $f_x$, and also includes DC to estimate the sensor offset. Any number of frequencies can be included in this vector. Not only will this generate estimates for the harmonic content of the sensor signal at these frequencies, but if the frequency $f_x$ is included in H, then the estimate for the content at frequency $f_d$ will not be corrupted by any sensor information at frequency $f_x$. This is particularly important in rotorcraft active noise and vibration control applications, because there are many disturbance tones in addition to those that need to be controlled that would otherwise degrade performance by corrupting the desired information. The vector $z_{1,k}$ contains estimates of the harmonic content corresponding to the frequencies in the vector H. The cosine and sine content for each frequency can be represented as a single complex number. The variable $\rho$ is a gain that determines the corner frequency of the first order low-pass anti-aliasing filter 124a. This filter 124a provides improved transient response compared to a straightforward low-pass filtering of the demodulated sensor signal (i.e. compared to $z_{1,k}=(1-\rho)z_{1,k-1}+\rho H y_k$) because the "cosine" content of $y_k$ does not corrupt the estimation of the "sine" component, and vice versa.

The update equation for $z_{1,k}$ is repeated for each sensor signal $y_k$. The estimates for the harmonic content of the signals are then used by the control algorithm at a reduced rate; that is, only every $N^{th}$ harmonic estimator output $z_{1,Nk}$ is used where N is the ratio $f_s/f_u$. Note that N does not need to be an integer; if it is not, then the control algorithm uses the most current output of the harmonic estimator 116a which will be no more than one sample old (at the sample rate $f_s$).

The control process performed by the controller 118 occurs at the reduced rate, as does any adaptation of the controller parameters (e.g. the gain matrix) that is required. This generates time varying variables $c_k$ and $d_k$ corresponding to the cosine and sine components of the desired actuator command signal. Because the control occurs at a reduced rate, these variables are only updated every $N^{th}$ sample. The output actuator command signal $u_k$ is then generated by remodulator 120a by multiplying the above variables by the reference sine and cosine terms:

$$u_k=c_k\cos(f_d t_k)+d_k\sin(f_d t_k)$$

The zero-order hold 121 converts the sampled signal back into a continuous time signal. The bandpass filter 119 may or may not be used to extract only the desired band, depending upon the frequency response of the actuators 108. If there are multiple tones being controlled, then the control signals for each tone are added together and output to the actuators 108. Thus, the approach described herein to obtain a low frequency estimate of a tone and to generate the control command signal is applicable to multiple tones.

Figure 2:
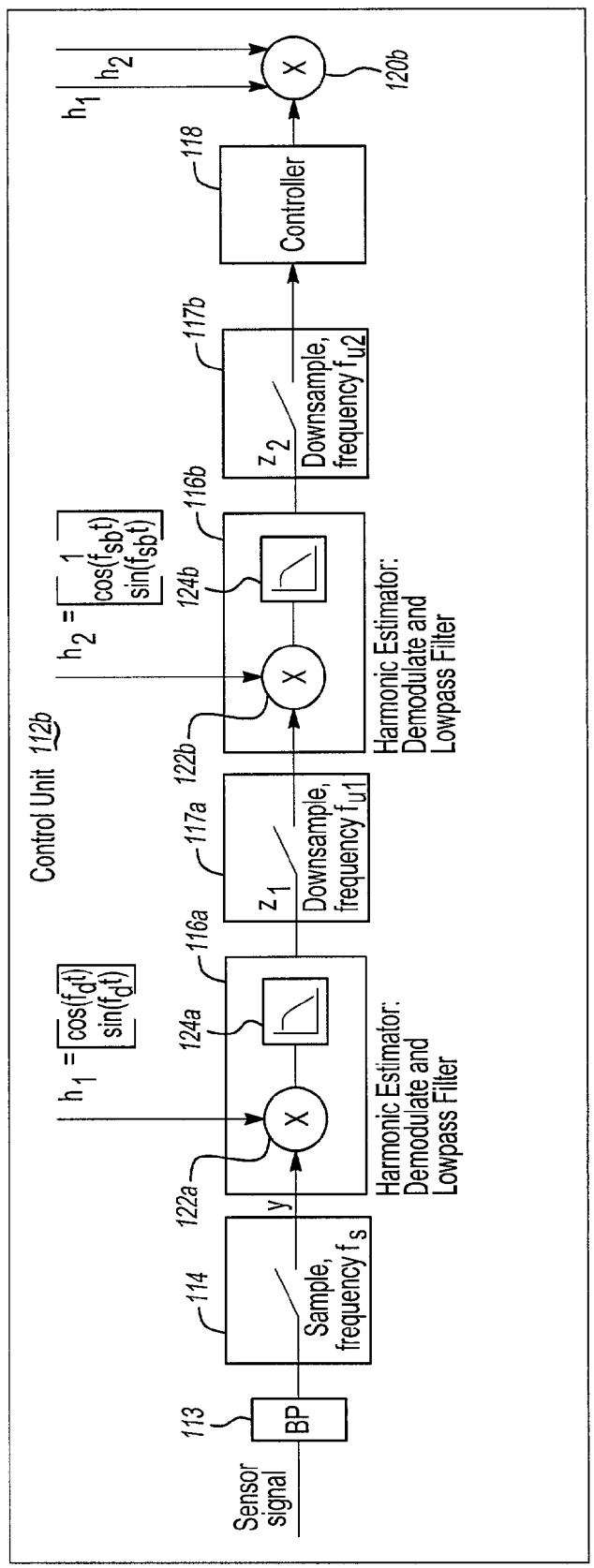
FIG. 2 shows an alternate control unit for the system of FIG. 1 utilizing a sequential harmonic estimation and a down-sampling approach for multiple, closely spaced tones.

FIG. 2 illustrates an alternate control unit 112b which extends the above process to problems with multiple, closely-spaced tones. The control unit 112b includes the harmonic estimator 116a, demodulator 122a, lowpass filter 124a, downsampler 117a and controller 118 that were described in the control unit 112a of FIG. 1 and further includes an additional set of these components (appended with the reference "b"), where the demodulator 122b receives a second reference frequency $h_2$. In many applications, particularly those involving rotating machinery, there can be side-bands $f_d+f_{sb}$ and $f_d-f_{sb}$ about the main tone $f_d$, such as in helicopter gear-mesh noise. The central tone plus side-bands form a group of closely spaced tones. If the total frequency band between the lowest and highest of these tones is small compared to the absolute frequencies within the band, then further computational savings can be obtained by applying the approach described herein sequentially, rather than including all of the tones in a single H vector. The approach to estimating the harmonic components of the signal can be applied to obtain the information about the entire group of tones by multiplying by sine and cosine terms at a central reference frequency. The variables $a_k$ and $b_k$ that are generated have information corresponding to the central frequency near DC as before, and information corresponding to nearby tones will appear as tones at the frequency of the difference between the original tone's frequency and the central reference frequency. Thus, if the original spectrum consisted of frequencies $f_d$, $f_d+f_{sb}$, and $f_d-f_{sb}$, then after demodulation by frequency $f_d$, the harmonic estimator output vector $z_{1k}=[a_k b_k]^T$ will have information at zero frequency and at $\pm f_{sb}$. The variables $a_k$ and $b_k$ can be low-pass filtered, or preferably, the same harmonic estimation process described earlier would be used which combines the two steps in harmonic estimator 116a. The variables can now be down-sampled to an intermediate sample frequency $f_{u1}$, where this new sample rate must be higher than the bandwidth between the lowest and highest frequency in the group of tones. In the example spectrum, an intermediate sample frequency $f_{u1}$ of $3f_{sb}$ would be sufficient, which may be much smaller than the sample rate required for the original spectrum. The individual tones can then be extracted using an identical procedure, where this intermediate sampling frequency $f_{u1}$ takes the place of the original sampling frequency $f_s$. This two-step harmonic estimator process is shown for the example spectrum in FIG. 2. Note that for the example frequency spectrum, both the cosine and sine estimates at the intermediate frequency contain only DC and a single tone at $f_{sb}$. The two-step process results in six variables. The estimates of the DC component of the intermediate harmonic estimates correspond to the cosine and sine component of the central reference frequency $f_d$ in the original measurement. The cosine and sine estimates of the $f_{sb}$ tone in each of the two intermediate harmonic estimator outputs are related to the cosine and sine components of the original $f_d+f_{sb}$ and $f_d-f_{sb}$ tones through a simple matrix transformation.

Once the control computations have been performed by controller 118, the control output signal can be generated by the same two-step process, including the transformation matrix and the intermediate reconstruction frequency.

Figure 3:
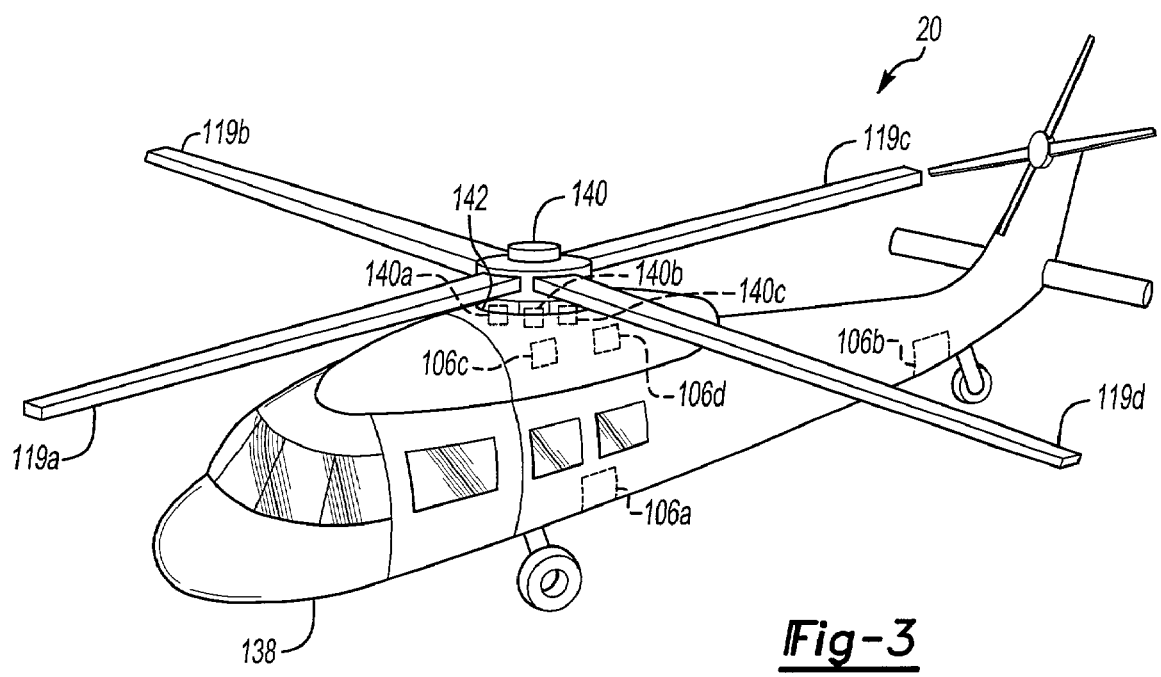
FIG. 3 shows a vehicle in which the present invention may be used.

FIG. 3 shows a perspective view of a vehicle 138 in which the present invention can be used. Vehicle 138, which is typically a helicopter, has rotor blades 139 (a) ... (d). Gearbox housing 140 is mounted at an upper portion of vehicle 138 to vehicle airframe 142. Sensors 106(a) through (d) (generally 106) are used to sense acoustic vibration produced by the vehicle, which can be from the rotorblades 119 or the gearbox housing 140. Although only four sensors are shown, there are typically any suitable number of sensors necessary to provide sufficient feedback to the controller (not shown). The sensors 106 may be mounted in the vehicle cabin, on gearbox mounting feet 140a-c, or to the airframe 142, or to another location on the vehicle 138 that enables vehicle vibrations or acoustic noise to be sensed. Sensors 106 are typically microphones, accelerometers or other sensing devices that are capable of sensing vibration produced by gear clash from the gearbox 140 and generating a signal as a function of the sensed vibration. These sensors generate electrical signals (voltages) that are proportional to the local noise or vibration.

The present invention has been described in detail by way of examples and illustrations for purposes of clarity and understanding, and not to in any way limit the scope of what is claimed. Those skilled in the art will understand that certain changes and modifications may be made without departing from the scope of the invention. Alphanumeric identifiers for steps in the method claims are for ease of reference by dependent claims, and do not indicate a required sequence unless otherwise indicated.

What is claimed is:

1. A method for controlling a physical variable at a frequency of interest ($f_d$) including the steps of:
   a) sampling the physical variable at a sample frequency less than twice the frequency of interest ($f_d$);
   b) calculating at least one control command based upon the sampling of the physical variable;
   c) generating a force for controlling the physical variable based upon the control command;
   wherein the physical variable is sound or vibration, and wherein the force is sound or vibration.

2. The method of claim 1, further including the steps of: bandpass filtering the physical variable prior to said step a).

3. The method of claim 2 wherein said bandpass filter extracts a frequency range with a lower bound generally given by $(2n-1)*f_s/2$ and an upper bound generally given by $(2n+1)*f_s/2$, where n is an integer chosen so that the frequency of interest ($f_d$) is within the extracted frequency range.

4. The method of claim 1 wherein said physical variable includes information within a bandwidth including said frequency of interest and wherein said sampling frequency is at least twice the bandwidth of this information.

5. The method of claim 1 further including the step of generating the at least one control command at a rate less than twice the frequency of interest.

6. The method of claim 1 wherein the force generated in said step c) reduces the amplitude of the physical variable.

7. The method of claim 6 wherein the force is generated in said step c) by an actuator, the actuator generating the force based upon the control command.

8. A method for computing control commands at a reduced rate in a noise or vibration control system including the steps of:
   a) sensing a physical variable;
   b) identifying harmonic components ($a_k$, $b_k$) of the physical variable at a frequency of interest ($f_d$);
   c) down-sampling the harmonic components ($a_k$, $b_k$) to a lower update frequency ($f_u$);
   d) performing control computations on the harmonic components ($a_k$, $b_k$) at the lower update frequency ($f_u$); and
   e) generating control commands based upon the control computations.

9. The method of claim 8 further including the step of:
   f) generating harmonic components of the control commands in said step e).

10. The method of claim 9, further including the step of:
    g) generating a control output at a frequency higher than the lower update frequency.

11. The method of claim 8 further comprising:
    low-pass anti-aliasing filtering to prevent aliasing in sampling at a lower update frequency ($f_u$).

12. The method of claim 8, further comprising:
    obtaining estimates of the harmonic components by computing a fast-Fourier transform of the physical variable; and
    extracting the result corresponding to the frequency of interest ($f_d$).

13. The method of claim 8, wherein said physical variable comprises a plurality of physical variables, said method further including the steps of:
    f) generating a sensed signal as a function of each of said plurality of physical variables; and
    g) computing harmonic estimates $Z_k$ for each sensed signal $y_k$ at each sample time $t_k$ according to $Z_k = Z_{k-1} + \rho H(y_k - H^T Z_{k-1})$, where:
    $H = [1\ \cos(f_d t_k)\ \sin(f_d t_k)\ \cos(f_x t_k)\ \sin(f_x t_k), \ldots]^T$ and where:
    $f_d t_k$ = desired frequency;
    $f_x t_k$ = frequency of unwanted information in $y_k$;
    $Z_k$ = estimates of harmonic content of $y_k$ at time k;
    $Z_{k-1}$ = estimates of harmonic content at time k−1;
    $\rho$ = a variable gain that determines the corner frequency of the first order low-pass anti-aliasing filter;
    $y_k$ = sensed signal vector at time k;
    $(\cdot)^T$ = transpose of a vector or matrix.

14. The method of claim 13, further comprising utilizing every $N^{th}$ harmonic estimator output $Z_{Nk}$ where N is the ratio of the sampling frequency and the update frequency ($f_s/f_u$).

15. The method of claim 13, further comprising:
    generating separate control commands for each of multiple tones;
    adding control commands for each tone; and
    outputting a sum of the control commands for each tone to one or more force generators.

16. A method for analyzing a physical variable having a first frequency of interest $f_1$ and a second frequency of interest $f_2$ in a noise or vibration control system, including the steps of:
    a) identifying first harmonic components $a_{k1}$, $b_{k1}$ of the first frequency of interest $f_1$;
    b) down-sampling the harmonic components $a_{k1}$, $b_{k1}$ at an intermediate frequency $f_{u1}$;
    c) identifying second harmonic components $a_{k2}$, $b_{k2}$ of a difference between the first frequency of interest $f_1$ and the second frequency of interest $f_2$;
    d) down-sampling the harmonic components $a_{k2}$, $b_{k2}$ at an update frequency $f_{u2}$; and
    e) analyzing information at the first frequency of interest $f_1$ and the second frequency of interest $f_2$ based upon said harmonic components $a_{k1}$, $b_{k1}$ and $a_{k2}$, $b_{k2}$.

17. The method of claim 16 wherein the intermediate frequency $f_{u1}$ is higher than the update frequency $f_{u2}$.

18. The method of claim 16 further including the steps of:
   f) generating control signals at the update frequency $f_{u2}$ based upon said step e).

19. An apparatus for sensing physical variables at a reduced rate in a noise or vibration control system comprising:
   a sensor adapted to sense physical variables at a sample frequency ($f_s$) less than twice a frequency of interest ($f_d$), and to generate a sensed signal as a function of the sensed physical variable; and
   a control circuit adapted to establish the frequency of interest ($f_d$), and to establish the sample frequency ($f_s$),
   wherein the control circuit filters the sensed signals to extract a frequency range with a lower bound given by $(2n-1)*f_s/2$ and an upper bound given by $(2n+1)*f_s/2$, where n is an integer chosen so that the frequency of interest ($f_d$) is within the extracted frequency range, wherein the control circuit generates a control command based upon the sensed signal to control the physical variable.

20. The apparatus of claim 19, wherein the control circuit attenuates the filtered sensed signal at a frequency less than the frequency of interest ($f_d$) by high-pass anti-aliasing to produce a resultant signal.

21. The apparatus of claim 19 wherein the control circuit aliases the filtered sensed signal to a lower frequency when there is no information present at the lower frequency in the sensed signal and the control circuit extracts desired information.

\* \* \* \* \*

UNITED STATES PATENT AND TRADEMARK OFFICE
CERTIFICATE OF CORRECTION

PATENT NO. : 7,224,807 B2
APPLICATION NO. : 10/083773
DATED : May 29, 2007
INVENTOR(S) : Welsh et al.

It is certified that error appears in the above-identified patent and that said Letters Patent is hereby corrected as shown below:

Claim 13 should read as follows: Col. 8, lines 23-39;

The method of Claim 6, wherein said physical variable comprises a plurality of physical variables, said method further including the steps of:
    f) generating a sensed signal as a function of each of said plurality of physical variables; and
    g) computing harmonic estimates $z_k$ for each sensed signal $y_k$ at each sample time $t_k$ according to $z_k = z_{k-1} + \rho H(y_k - H^T z_{k-1})$, where:

$H = [\ 1\ \cos(f_d t_k)\ \sin(f_d t_k)\ \cos(f_x t_k)\ \sin(f_x t_k),\ ...\ ]^T$ and where:

$f_d t_k$ = desired frequency;
$f_x t_k$ = frequency of unwanted information in $y_k$;
$z_k$ = estimates of harmonic content of $y_k$ at time k;
$Z_{k-1}$ = estimates of harmonic content at time k-1;
$\rho$ = a variable gain that determines the corner frequency of the first order low-pass anti-aliasing filter;
$y_k$ = sensed signal vector at time k;
$(\cdot)^T$ = transpose of a vector or matrix.

Signed and Sealed this

Twenty-eighth Day of August, 2007

JON W. DUDAS
*Director of the United States Patent and Trademark Office*